United States Patent [19]

Grossman et al.

[11] 4,304,603

[45] Dec. 8, 1981

[54] GLASS-CERAMIC COMPOSITIONS DESIGNED FOR RADOMES

[75] Inventors: David G. Grossman, Corning; Richard W. Waldron, Big Flats, both of N.Y.

[73] Assignee: Corning Glass Works, Corning, N.Y.

[21] Appl. No.: 177,010

[22] Filed: Aug. 11, 1980

[51] Int. Cl.$^3$ .................. C03B 32/00; C03C 3/22; C03C 3/30

[52] U.S. Cl. .................................. 501/9; 65/31; 65/33; 501/136

[58] Field of Search .............. 65/31, 33; 106/39.8

[56] References Cited

U.S. PATENT DOCUMENTS

| | | | |
|---|---|---|---|
| 2,920,971 | 1/1960 | Stookey | 65/33 X |
| 3,252,778 | 5/1966 | Goodman et al. | 106/39.8 X |
| 3,490,888 | 1/1970 | Stong | 65/33 |
| 3,531,307 | 9/1970 | Rubin et al. | 65/33 X |

OTHER PUBLICATIONS

D. G. Grossman, "Fortification of Radume Glass-Ceramics", Paper Presented at Fourteenth Symposium on Electromagnetic Windows, Georgia Institute of Technology, Jun. 21-23, 1978.

*Primary Examiner*—Richard V. Fisher
*Attorney, Agent, or Firm*—Clinton S. Janes, Jr.

[57] ABSTRACT

The instant invention is drawn to glass-ceramics especially designed for the fabrication of radomes, wherein cordierite is the predominant crystal phase but which also contain minor amounts of cristobalite, magnesium-aluminum titanate, and rutile, having overall compositions consisting essentially, expressed in weight percent on the oxide basis, of about

| | |
|---|---|
| MgO | 15–18 |
| $Al_2O_3$ | 21–25 |
| $SiO_2$ | 48–53 |
| $TiO_2$ | 9.5–11.5 |
| $As_2O_3$ | 0–1 |

5 Claims, No Drawings

GLASS-CERAMIC COMPOSITIONS DESIGNED FOR RADOMES

BACKGROUND OF THE INVENTION

A radome is a structure which envelopes and protects a radar antenna from the environment and, desirably, causes very little interference with the signal. Missile radomes are ogival or bullet-shaped shells which shield the antenna from high air velocities, rain, etc. Radomes fabricated from fiber glass have proven satisfactory for missiles operating at low velocities. With high velocity missiles, however, where greater surface heating, larger loading forces, and more severe rain erosion are encountered, radomes manufactured from ceramic materials have been utilized. Ceramic radomes must have the capability of being shaped through grinding to a very specifically-defined prescription, this prescription being designed to insure that the resistance to the signal of the antenna is uniform in every direction.

For over 20 years Corning Glass Works, Corning, N.Y. has manufactured radomes for radar guided missiles from a glass-ceramic material marketed as Corning 9606. That product is highly crystalline with cordierite ($2MgO.2Al_2O_3.5SiO_2$) constituting the predominant crystal phase with minor amounts of cristobalite (a polymorph of $SiO_2$), rutile ($TiO_2$), and a phase until recently believed to be magnesium dititanate ($MgO.2TiO_2$) being present also. An approximate analysis of the material, expressed in weight percent on the oxide basis, is reported below:

| | |
|---|---|
| $SiO_2$ | 56.1 |
| $Al_2O_3$ | 19.7 |
| $MgO$ | 14.9 |
| $As_2O_3$ | 0.4 |
| $TiO_2$ | 8.9 |

To be useful as a radome, a material must comply with a complex matrix of mechanical, electrical, thermal, and forming properties, several of the most important of which are discussed in the following text.

The candidate glass-ceramic should exhibit a low loss tangent. The loss tangent defines the quantity of energy absorbed by a material from radiation passing therethrough. High loss tangents have the effect of reducing the range of the radar. Furthermore, not only is the magnitude of the loss tangent significant, but the level thereof should be reasonably stable over the range of temperatures to be encountered by the material. Corning 9606 demonstrates a loss tangent at $8.6 \times 10^9$ Hz of 0.00030 at 25° C.

The wall thickness of a radome is dictated by three factors: loss tangent, the dielectric constant of the material, and the particular wavelength of radiation being employed. Interference with the signal will be at a minimum if the thickness of the wall is a multiple of one-half a wavelength. The dielectric constant affects the velocity of the radiation and, hence, the wavelength thereof in the glass-ceramic. When the loss tangent is kept minimal, the thickness of the wall can be increased with decreasing values of dielectric constant. Also, as with loss tangent, the dielectric constant ought not to vary greatly as the temperature of the radome rises. Corning 9606 has a dielectric constant of 5.5 at room temperature (25° C.) and $8.6 \times 10^9$ Hz, and that value is substantially independent of temperature up to about 750° C. As noted above, dielectric constants greater than 5.5 would require somewhat thinner wall thicknesses and such would result in greater internal heating of the apparatus within the radome.

The radome material must exhibit high mechanical strength to support attachment to the missile, to survive the vibration which occurs during launch and flight, and to aid in overcoming thermal stress, the highest stresses being thermal in origin. Resistance to thermal shock is directly related to the mechanical strength, the elastic properties, and the coefficient of thermal expansion of a material. In general, the lower the coefficient of thermal expansion of a material, the greater will be its resistance to thermal shock. Corning 9606 displays an average coefficient of thermal expansion (25°-300° C.) of about $57 \times 10^{-7}/°$ C.

Because the newer missiles fly at higher velocities and under more severe conditions, an improved radome material is demanded which will demonstrate greater thermal shock resistance than Corning 9606, while exhibiting mechanical, electrical, and forming properties similar to those of Corning 9606.

U.S. Pat. No. 2,920,971, the basic patent in the field of glass-ceramics, discloses the production of glass-ceramic articles as involving the controlled crystallization of precursor glass articles through a carefully-defined heat treatment thereof. Hence, the formation of a glass-ceramic body comprehends three general steps: first, a glass-forming batch of the proper composition is melted; second, the melt is simultaneously cooled to a temperature at least below the transformation range thereof and a glass body of a desired geometry shaped therefrom; and, third, the glass body is subjected to a predetermined heat treatment at temperatures above the transformation range to cause the glass to crystallize in situ. Frequently, this third step is divided into two parts. Thus, the glass body will initially be heated to a temperature at or somewhat above the transformation range and held thereat for a sufficient length of time to cause the development of nuclei in the glass. Subsequently, the nucleated glass body is heated to a higher temperature, often above the softening point thereof, and maintained thereat for a period of time sufficient to effect the growth of crystals on the nuclei. This two-step practice customarily results in a more homogeneously crystallized material wherein the crystals are more uniformly sized.

The microstructure, the general characteristics, and the method for making glass-ceramic articles are discussed in considerable detail in U.S. Pat. No. 2,920,971, and that patent is specifically referred to for a fuller understanding of those features.

A very significant advantage which radomes fabricated from glass-ceramics possess, when compared with those fashioned through slip casting or other forming method for ceramic materials, is a high degree of chemical and structural homogeneity. Thus, the precursor glass can be melted to a very fine homogeneity and then dropped into a spinning mold to form the basic ogival article. Furthermore, deformation during crystallization in situ is very slight in contrast to that taking place during sintering of a ceramic body. Accordingly, grinding the radome structure to the demanded prescription is more easily accomplished than with a sintered ceramic body.

To impart the required mechanical strength to Corning 9606 radomes, the bullet-shaped structures, after grinding to the required prescription, are subjected to what has been termed a fortification treatment. That treatment comprises subjecting the glass-ceramic to a sequential base-acid leaching process. Thus, the radome is initially contacted with (normally immersed into) an alkaline solution and thereafter, after removing the alkaline solution, it is contacted with (immersed into) an acid solution. That series of steps may be repeated several times in order to achieve the desired effect. As a matter of convenience and economics, a boiling aqueous NaOH solution has constituted the alkaline environment and an aqueous, room temperature $H_2SO_4$ solution has provided the acid conditions. The base and acid were customarily removed via rinsing in tap water.

The improvement in strength is deemed to result via healing surface flaws in the body. This phenomenon is due to the cristobalite being leached out of the microstructure (cristobalite is several times more quickly dissolved in hot NaOH solution than is cordierite). The acid acts upon the little residual glass left in the glass-ceramic body. After fortification, Corning 9606 demonstrates an average modulus of rupture of about 35,000 psi. A somewhat porous surface layer is developed which protects the radome body from surface abuse encountered in use that would reduce its strength. Some care must be exercised in carrying out the fortification process, however. Thus, excessive treatment causes a reduction in strength. Although the reason for this reduction has not been rigorously studied, it has been postulated that overstretching may lead to the development of new flaws in the body surface or simply that too much material is removed therefrom. Empirical observation has determined that a porous surface layer having a depth of about 0.005"-0.015" appears to yield the most desirable strength properties.

In general, glass-ceramic articles containing cordierite as the predominant crystal phase, but with little or no cristobalite, will demonstrate mechanical strengths, as defined through modulus of rupture measurements of less than 20,000 psi, whereas those cordierite-containing articles with a minor, but significant, amount of cristobalite will evidence modulus of rupture measurements in excess of 30,000 psi after fortification. X-ray diffraction analysis and electron microscopy have indicated that Corning 9606 contains about 10% by volume cristobalite.

OBJECTIVE OF THE INVENTION

The principal objective of the instant invention is to device glass-ceramic compositions for the fabrication of radomes which exhibit electrical properties similar to those displayed by Corning 9606 to permit the same design parameters for the radar system to be used, which can be fortified to mechanical strengths in excess of 30,000 psi, and which will manifest a lower coefficient of thermal expansion than Corning 9606.

SUMMARY OF THE INVENTION

We have found that the above objective can be achieved in compositions falling within the following, narrowly-defined ranges. Thus, glass-ceramics capable of being formed into radomes exhibiting loss tangents at 25° C. and $8.6 \times 10^9$ Hz no greater than about 0.00035, dielectrric constants at room temperature (25° C.) and $8.6 \times 10^9$ Hz no more than about 6, modulus of rupture values after fortification in excess of 30,000 psi, and coefficients of thermal expansion (25°-300° C.) of less than about $45 \times 10^{-7}$/° C. can be produced from precursor glasses consisting essentially, expressed in weight percent on the oxide basis, of about 15-18% MgO, 21-25% $Al_2O_3$, 48-53% $SiO_2$, 9.5-11.5% $TiO_2$, and 0-1% $As_2O_3$, crystallized in situ via heat treatments at temperatures between about 1000°-1300° C. The preferred heat treatment contemplates nucleation within the temperature interval of 800°-900° C. for 1-6 hours followed by crystallization at 1150°-1300° C. for 4-12 hours. Cordierite comprises the predominant crystal phase with minor amounts of cristobalite rutile, and a phase which, although previously believed to be magnesium dititanate, is now deemed to be better termed magnesium-aluminum titanate, being observed. Thus, it has been recognized that complete solubility exists between $Mg_2Ti_2O_5$ and $AlTiO_5$. Moreover, examination of the crystals via X-ray emission spectroscopy has indicated the presence of approximately 7.5% $Al_2O_3$. These factors have led to the conclusion that the crysrtals are a magnesium-aluminum titanate.

PRIOR ART

U.S. Pat. No. 2,920,971 discloses the production of glass-ceramic articles wherein cordierite constitutes the predominant crystal phase. In truth, Example 15 thereof is essentially the composition of Corning 9606.

U.S. Pat. No. 3,275,493 describes glasses having compositions within the ranges of 10-22% MgO, 30-40% $Al_2O_3$, 40-57% $SiO_2$, and 0.5-6% $As_2O_3$ and/or $Sb_2O_3$ which, when heat treated in a particular manner, will develop integral crystalline surface layers thereupon wherein cordierite is the principal glass.

DESCRIPTION OF THE PREFERRED EMBODIMENTS

Table I reports several compositions, recorded in terms of parts by weight on the oxide bases as calculated from the batch, illustrating the parameters of the invention. Because the sum of the individual components totals or approximately totals 100, for all practical purposes the tabulated values may be deemed to reflect weight percent. The actual batch ingredients may comprise either the oxides or other compounds, which, when melted together, will be converted into the desired oxides in the proper proportions. In the succeeding exemplary compositions, the batch materials consisted of highly pure MgO, $Al_2O_3$, $SiO_2$, $TiO_2$, and $As_2O_3$. The latter ingredient performed its customary function of a fining agent.

The batch ingredients were compounded, dry ball-milled together to assist in achieving a homogeneous melt, and then placed into platinum crucibles. After covering, the crucibles were introduced into a furnace operating at about 1600° C. and the batches were melted for about six hours with stirring. Thereafter, the melts were cast into steel molds to form slabs having dimensions of about 6"×6"×⅓" and those slabs transferred immediately to an annealer operating at about 750° C.

TABLE I

|  | 1 | 2 | 3 | 4 | 5 |
|---|---|---|---|---|---|
| MgO | 15.8 | 16.0 | 16.9 | 17.8 | 13.3 |
| $Al_2O_3$ | 23.2 | 21.3 | 22.2 | 22.2 | 28.5 |
| $SiO_2$ | 49.9 | 51.6 | 49.8 | 48.9 | 47.1 |
| $TiO_2$ | 10.7 | 10.7 | 10.7 | 10.7 | 10.7 |
| $As_2O_3$ | 0.4 | 0.4 | 0.4 | 0.4 | 0.4 |

The slabs were introduced into an electrically-heated furnace, the temperature therein raised at 200° C./hour to 820° C., that temperature held for about two hours to induce nucleation, the temperature again raised at 200° C./hour to about 1260° C., that temperature maintained for about eight hours to grow crystals on the nuclei, and the electric current to the furnace cut off and the slabs allowed to cool to room temperature retained within the furnace. This latter practice has been termed "cooling at furnace rate" and averages about 3°–5° C./minute.

Samples were cut from the glass-ceramic slabs for measurement in the conventional manner of coefficient of thermal expansion, dielectric constant, and loss tangent. Other samples having dimensions useful in conducting modulus of rupture measurements were cut from the slabs and subjected to six cycles of the above-described base-acid fortification treatment. Thus, the samples were first immersed into boiling aqueous 5% NaOH solution and held therein for 25 minutes. After rinsing in cold tap water, the samples were immersed into an aqueous 5% $H_2SO_4$ solution at room temperature, retained therein for 10 minutes, and then rinsed in cold tap water. That sequence of steps was repeated six times. Microscopic examination of a cross section cut through the samples indicates a porous surface layer having a depth of about 0.010"–0.015". Modulus of rupture measurements were conducted on the fortified samples in the conventional manner. Table II lists the measured results for coefficient of thermal expansion (coef. exp.) over the range of 25°–300° C. expressed in terms of $\times 10^{-7}/°$ C., the dielectric constant (D.C.) at 25° C. and $8.6 \times 10^9$ Hz, the loss tangent (L.T.) at 25° C. and $8.6 \times 10^9$ Hz, and the modulus of rupture (MOR) of the fortified samples in terms of psi.

TABLE II

|  | 1 | 2 | 3 | 4 | 5 |
|---|---|---|---|---|---|
| Coef. Exp. | 40.4 | 35.7 | 40.4 | 30.2 | 23 |
| D.C. | 5.64 | 5.66 |  |  | 6.15 |
| L.T. | 0.00029 | 0.00032 |  |  | 0.0003 |
| MOR | 32,130 | 30,030 | 31,200 | 34,600 | 18,690 |

The criticality of composition is apparent from an examination of Tables I and II. Hence, Example 5, having a composition just slightly outside the inventive ranges, is not sufficiently mechanically strong to serve as a radome. X-ray diffraction analysis of Example 5 indicated the essential absence of cristobalite therefrom, whereas like analyses of Example 1–4 demonstrated the presence of cristobalite crystallization therein. In all of the examples, cordierite comprised by far the predominant crystal phase accompanied with minor amounts of magnesium-aluminum titanate and rutile. Yet, Examples 1–4 evidence high mechanical strengths coupled with the necessary electrical properties for radome use and a coefficient of thermal expansion considerably below that of Corning 9606.

Because it represents the best overall combination of melting and forming properties, crystallization capabilities, along with the desired mechanical, electrical, and thermal characteristics, Example 1 is deemed to constitute the most preferred embodiment of the inventive compositions.

We claim:

1. A glass-ceramic suitable for the fabrication of radomes with porous surface layers having a depth of about 0.005"–0.015", said glass-ceramic exhibiting a loss tangent at 25° C. and $8.6 \times 10^9$ Hz no greater than about 0.00035, a dielectric constant at 25° C. and $8.6 \times 10^9$ Hz no more than about 6, a modulus of rupture after fortification in excess of 30,000 psi, a coefficient of thermal expansion (25°–300° C.) of less than about $45 \times 10^{-7}/°$ C., and wherein cordierite constitutes the predominant crystal phase along with minor amounts of cristobalite, magnesium-aluminum titanate, and rutile, said glass-ceramic having an overall composition consisting essentially, expressed in weight percent on the oxide basis, of about 15–18% MgO, 21–25% $Al_2O_3$, 48–53% $SiO_2$, 9.5–11.5% $TiO_2$, and 0–1% $As_2O_3$.

2. A glass-ceramic according to claim 1 consisting essentially, as calculated from the batch of:

| MgO | 15.8 |
|---|---|
| $Al_2O_3$ | 23.2 |
| $SiO_2$ | 49.9 |
| $TiO_2$ | 10.7 |
| $As_2O_3$ | 0.4 |

3. A method for making a glass-ceramic suitable for the fabrication of radomes exhibiting a loss tangent at 25° C. and $8.6 \times 10^9$ Hz no greater than about 0.00035, a dielectric constant at 25° C. and $8.6 \times 10^9$ Hz no more than about 6, a modulus of rupture after fortification in excess of 30,000 psi, and a coefficient of thermal expansion (25°–300° C.) of less than about $45 \times 10^{-7}/°$ C. which comprises the steps of:
  (a) melting a batch for a glass consisting essentially, expressed in weight percent on the oxide basis, of about 15–18% MgO, 21–25% $Al_2O_3$, 48–53% $SiO_2$, 9.5–11.5% $TiO_2$, and 0–1% $As_2O_3$;
  (b) simultaneously cooling the melt at least below the transformation range thereof and forming a glass shape of a desired configuration therefrom;
  (c) heat treating said glass shape at a temperature between about 1000°–1300° C. for a period of time sufficient to cause the in situ crystallization of cordierite as the predominant crystal phase along with minor amounts of cristobalite, magnesium-aluminum titanate, and rutile;
  (d) contacting the surface of said crystallized shape with an alkaline solution to leach out cristobalite therefrom;
  (e) removing said alkaline solution from the surface of said crystallized shape;
  (f) contacting the surface of said crystallized shape with an acid solution to leach out residual glass therefrom;
  (g) removing said acid solution from the surface of said crystallized shape; and then
  (h) sequentially repeating steps (d)–(g) a sufficient number of times to produce a porous surface layer having a depth of about 0.005"–0.015".

4. A method according to claim 3 wherein said heat treating consists of first heating said glass shape to about 800°–900° C. for about 1–6 hours to cause the development of nuclei therein and then heating said shape to about 1150°–1300° C. for about 4–12 hours to cause the growth of crystals on said nuclei.

5. A method according to claim 3 wherein said batch consists essentially of:

| MgO | 15.8 |
|---|---|
| $Al_2O_3$ | 23.2 |
| $SiO_2$ | 49.9 |
| $TiO_2$ | 10.7 |
| $As_2O_3$ | 0.4 |

* * * * *